(12) United States Patent
Tsutsumi et al.

(10) Patent No.: US 9,022,899 B2
(45) Date of Patent: May 5, 2015

(54) CONTROL APPARATUS FOR HYBRID VEHICLE

(71) Applicant: Toyota Jidosha Kabushiki Kaisha, Toyota-shi, Aichi (JP)

(72) Inventors: Takahiko Tsutsumi, Toyota (JP); Toshio Sugimura, Toyota (JP); Seiji Kuwahara, Toyota (JP); Koki Minamikawa, Toyota (JP); Shun Sato, Toyota (JP)

(73) Assignee: Toyota Jidosha Kabushiki Kaisha (JP)

(*) Notice: Subject to any disclaimer, the term of this patent is extended or adjusted under 35 U.S.C. 154(b) by 0 days.

(21) Appl. No.: 14/172,071

(22) Filed: Feb. 4, 2014

(65) Prior Publication Data
US 2014/0221152 A1    Aug. 7, 2014

Related U.S. Application Data

(60) Provisional application No. 61/761,101, filed on Feb. 5, 2013.

(51) Int. Cl.
*B60W 20/00* (2006.01)
*B60W 10/02* (2006.01)
(Continued)

(52) U.S. Cl.
CPC ............ *B60W 20/40* (2013.01); *Y10S 903/902* (2013.01); *Y10T 477/26* (2015.01); *B60W 20/30* (2013.01); *B60W 10/02* (2013.01); *B60W 10/06* (2013.01); *B60W 10/115* (2013.01); *F16H 61/061* (2013.01)

(58) Field of Classification Search
CPC ..................................................... B60W 20/30
USPC ............................................................. 475/1–15
See application file for complete search history.

(56) References Cited

U.S. PATENT DOCUMENTS

| 7,908,065 B2* | 3/2011 | Kuwahara et al. ............... 701/51 |
| 2004/0092362 A1* | 5/2004 | Ayabe et al. .................... 477/62 |

(Continued)

FOREIGN PATENT DOCUMENTS

| JP | 2007069789 A | 3/2007 |
| JP | 2008045676 A | 2/2008 |
| JP | 2008207643 A | 9/2008 |

OTHER PUBLICATIONS

Machine Translation of Japanese Publication No. 2008-045676 A; Published Feb. 28, 2008.

(Continued)

*Primary Examiner* — Tisha Lewis
(74) *Attorney, Agent, or Firm* — Dinsmore & Shohl LLP

(57) ABSTRACT

Control apparatus for hybrid vehicles are described which reduce the heat generated by a clutch and improve the response of the hybrid vehicle when an operator requests a high degree of acceleration while starting the engine and the transmission is required to perform a shift-down. In one embodiment, when the engine is required to start while the transmission is required to perform a shift-down action, the control apparatus holds a hydraulic pressure of a releasing side clutch of the transmission at a predetermined lowest stand-by value preventing a slipping action of the releasing side clutch, while a clutch K0 between the motor and engine is placed in a slipping state, and reduces the hydraulic pressure of the releasing side clutch from the lowest stand-by value in the slipping state of the clutch K0 after the clutch K0 is placed in the fully engaged state.

3 Claims, 8 Drawing Sheets

(51) Int. Cl.
*B60W 10/06* (2006.01)
*B60W 10/115* (2012.01)
*F16H 61/06* (2006.01)

(56) References Cited

U.S. PATENT DOCUMENTS

2007/0056783 A1 3/2007 Joe et al.
2010/0292899 A1* 11/2010 Kitaori et al. .................. 701/52
2014/0222269 A1* 8/2014 Tsutsumi et al. ............... 701/22

OTHER PUBLICATIONS

Machine Translation of Japanese Publication No. 2008-207643 A; Published Sep. 11, 2008.

* cited by examiner

|     | C1 | C2 | B1 | B2  | F1 | SPEED RATIO |
|-----|----|----|----|-----|----|-------------|
| 1st | O  |    |    | (O) | O  | 3.20        |
| 2nd | O  |    | O  |     |    | 1.72        |
| 3rd | O  | O  |    |     |    | 1.00        |
| 4th |    | O  | O  |     |    | 0.67        |
| R   | O  |    |    | O   |    | 3.20        |
| N   |    |    |    |     |    |             |

O : ENGAGED

CONTROL APPARATUS FOR HYBRID VEHICLE

The present specification claims priority to U.S. Provisional Patent Application Ser. No. 61/761,101 filed Feb. 5, 2013 and entitled "CONTROL DEVICE FOR HYBRID VEHICLE," the entirety of which is incorporated by reference herein.

TECHNICAL FIELD

The present specification relates to a control apparatus for a hybrid vehicle provided with a clutch disposed in a power transmitting path between an engine and an electric motor, and a transmission of a step-variable type disposed in a power transmitting path between the electric motor and drive wheels, and more particularly to techniques for reducing an amount of generation of heat by the clutch and for improving a response of the hybrid vehicle to a requirement for a shift-down action of the transmission, upon requirement for a shift-down action of the transmission concurrently with starting of the engine.

BACKGROUND

Hybrid vehicles may include an engine, an electric motor, a clutch disposed in a power transmitting path between the engine and the electric motor, and a transmission of a step-variable type disposed in a power transmitting path between the electric motor and drive wheels. The hybrid vehicle may be configured to start the engine by increasing an operating speed of the engine with a dragging torque of the clutch placed in a slipping state. Patent Document 1 discloses an example of such a hybrid vehicle.

A hybrid vehicle as described is configured such that when the engine is required to be started as a result of an operation (request for drive force) by a vehicle operator during operation of the hybrid vehicle with the electric motor while the transmission is required to perform a shift-down action, the starting of the engine and the shift-down action are concurrently implemented to improve a response of the hybrid vehicle to the operator's desire for a high degree of acceleration.

PRIOR ART DOCUMENT

Patent Document

Patent Document 1: JP-2008-207643 A

SUMMARY

In the hybrid vehicle as described above, the clutch is placed in a slipping state, as a result of the shift-down action, to increase an operating speed of the engine while an input speed of the transmission, namely, the operating speed of the electric motor is increased to a value greater than that before the shift-down action, since the engine starting and the shift-down action are concurrently implemented to improve the response of the hybrid vehicle to the operator's desire for a high degree of acceleration. Accordingly, the amount of slipping of the clutch during engine starting is increased, increasing the amount of heat generated by the clutch during engine starting, and a consequent problem of protecting the clutch from the generated heat. Although this problem may be solved by implementing the shift-down action after completion of engine starting, this solution may cause deterioration of the vehicle response to the operator's desire for the high degree of acceleration due to an increased total length of time required for engine starting and the shift-down action implemented after engine starting, from a moment of the operation of the vehicle operator to accelerate the hybrid vehicle to a moment at which a drive force of the hybrid vehicle has been increased to a value desired by the vehicle operator.

The embodiments of control apparatuses and systems described herein were made in view of the background described above and provide a control apparatus for a hybrid vehicle, which permits reduction of the amount of heat generated by the clutch and an improvement of the response of the hybrid vehicle to the operator's desire for a high degree of acceleration in starting the engine while the transmission is required to perform a shift-down action.

A first aspect of the present specification provides (a) a control apparatus for a hybrid vehicle provided with an engine, an electric motor, a clutch disposed in a power transmitting path between the engine and the electric motor, and a transmission of a step-variable type disposed in a power transmitting path between the electric motor and drive wheels, the control apparatus being configured to increase an operating speed of the engine in a slipping state of the clutch, for completing the start of the engine when an operating state of the clutch has been changed from the slipping state into a fully engaged state, characterized in that (b) when the engine is started while the transmission is required to perform a shift-down action, (c) the control apparatus holds a hydraulic pressure of a releasing side clutch of the transmission at a predetermined lowest stand-by value preventing a slipping action of the releasing side clutch, while the clutch is placed in the slipping state, and reduces the hydraulic pressure of the releasing side clutch from the lowest stand-by value at which the hydraulic pressure is held in the slipping state of the clutch after the clutch has been placed in the fully engaged state.

According to the hybrid vehicle control apparatus configured as described above, when the engine is started while the transmission is required to perform a shift-down action, the hydraulic pressure of the releasing side clutch of the transmission is held at the predetermined lowest stand-by value preventing the slipping action of the releasing side clutch while the clutch is placed in the slipping state, so that the start of the engine is implemented while the input speed of the transmission is comparatively low, whereby an amount of slipping of the clutch is reduced. Accordingly, an amount of heat generated by the clutch during engine starting can be reduced. Further, the hydraulic pressure of the releasing side clutch is reduced from the lowest stand-by value when the clutch is brought into the fully engaged state, so that the shift-down action can be performed at a comparatively high rate after the clutch is brought into the fully engaged state, so that a response of the hybrid vehicle to the operator's desire for a high degree of acceleration is improved compared to the case where the shift-down action is implemented after completion of the start of the engine, for instance.

According to one embodiment, (a) a torque of the electric motor is temporarily kept at a value greater than a torque value before determination of a requirement for the shift-down action, (b) during a time period of reduction of the hydraulic pressure of the releasing side clutch from the lowest stand-by value while the clutch is placed in the slipping state. Accordingly, an input speed of the transmission can be increased to a speed value to be established upon completion of the shift-down action, at a comparatively high rate after the clutch has been brought into the fully engaged state, so that the response of the hybrid vehicle to the operator's desire for a high degree of acceleration can be further improved.

According to another embodiment, the shift-down action is performed with a releasing action of the releasing side clutch, and the torque of the electric motor is temporarily reduced when an input speed of the transmission has been increased to a speed value to be established after completion of the shift-down action. Accordingly, it is possible to effectively reduce an engaging shock of an engaging side clutch which takes place when the input speed of the transmission has been increased to the speed value to be established upon completion of the shift-down action.

DETAILED DESCRIPTION

Various embodiments of control apparatuses and systems for hybrid vehicles will be described in detail by reference to the drawings.

First Embodiment

Figure 1:
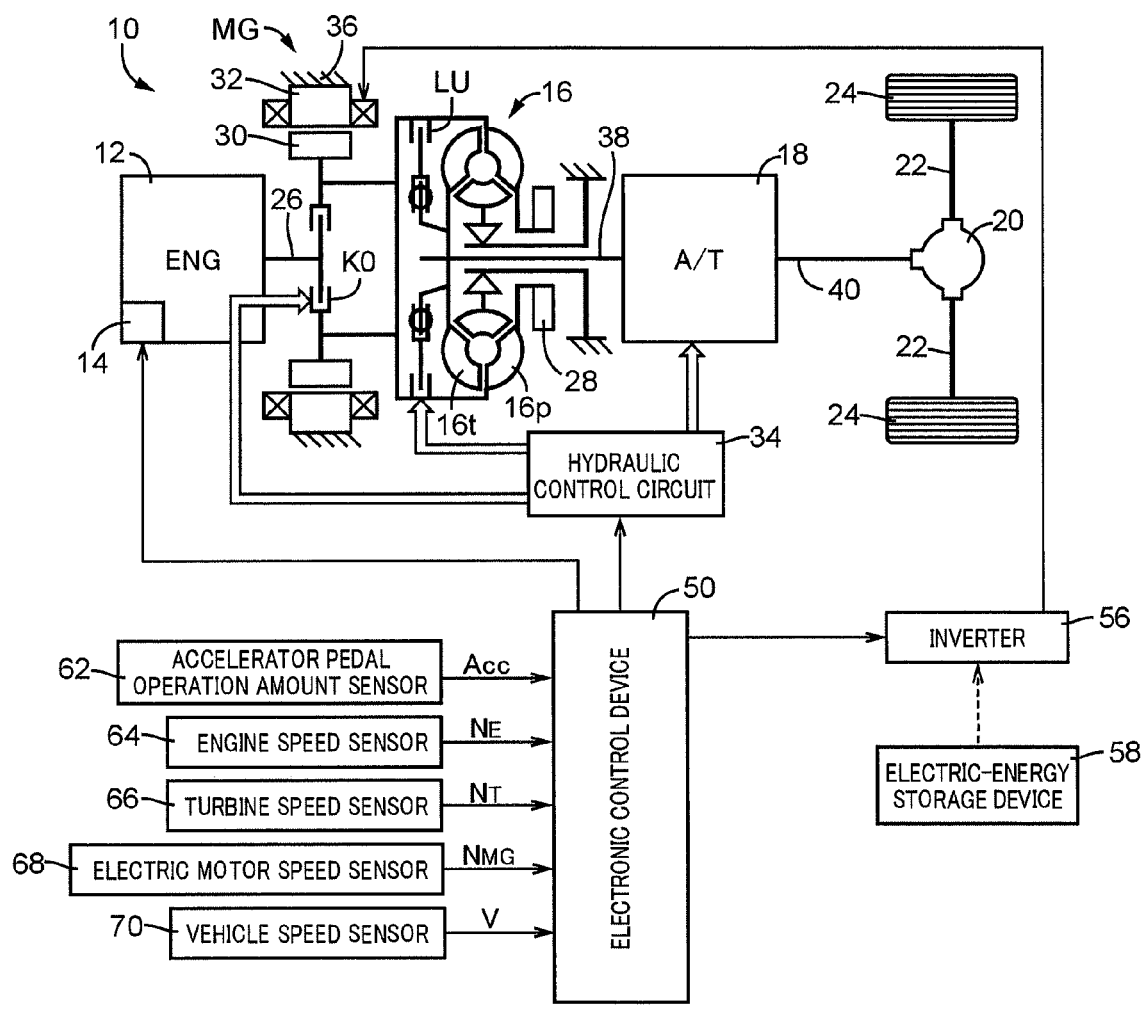
FIG. 1 schematically depicts an arrangement of a drive system of a hybrid vehicle to which the embodiments described herein are suitably applicable.

FIG. 1 schematically depicts arrangements of a drive device and a control apparatus of a hybrid vehicle drive system 10 (hereinafter referred to simply as "drive system 10") to which the embodiments described herein are suitably applicable. As shown in FIG. 1, the drive system 10 may be provided with an engine 12 and an electric motor MG. The engine 12 and motor MG function as vehicle drive power sources. Drive forces generated by the engine 12 and the electric motor MG are transmitted to a pair of left and right drive wheels 24 through a torque converter 16, an automatic transmission 18, a differential gear device 20, and a pair of left and right axles 22. The electric motor MG, torque converter 16 and automatic transmission 18 are accommodated in a transmission casing 36 (hereinafter referred to as "casing 36"). This casing 36 is an aluminum split casing formed by die casting and fixed to a stationary member such as a vehicle body. In the drive system 10 arranged as described above, at least one of the engine 12 and electric motor MG is used as the drive power source for running the hybrid vehicle. Namely, the drive system 10 is configured to selectively establish one of a plurality of vehicle drive modes such as: an engine drive mode in which the engine 12 is exclusively used as the drive power source; an EV drive mode (motor drive mode) in which the electric motor MG is exclusively used as the drive power source; and an EHV drive mode (hybrid drive mode) in which the engine 12 and electric motor MG are used as the drive power sources.

For example, the engine 12 may be an internal combustion engine such as a gasoline or diesel engine of a direct injection type in which a fuel is directly injected into combustion chambers of the engine. To control an operation (output torque) of the engine 12, there is provided an output control device 14 having a throttle actuator for opening and closing an electronic throttle valve, a fuel injecting device for implementing a fuel injection control, an igniting device for implementing an ignition timing control, etc. The output control device 14 is controlled according to commands supplied from an electronic control device 50, described below, to control the output of the engine 12 by controlling the throttle actuator to open and close the electronic throttle valve, thereby controlling the fuel injecting device to control the injection of fuel and the igniting device to control the ignition timing.

Between a pump impeller 16p and a turbine impeller 16t of the torque converter 16, a lock-up clutch LU is provided. The lock-up clutch LU is configured to connect the pump and turbine impellers 16p, 16t directly to each other so that the impellers 16p, 16t are rotated as a unit. This lock-up clutch LU is controlled such that the lock-up clutch LU is placed in one of an engaged state (fully engaged state), a slipping state and a released state (fully released state), according to a hydraulic pressure received from a hydraulic control circuit 34. A mechanical oil pump 28 is connected to the pump impeller 16p of the torque converter 16 and is operated by a rotary motion of the pump impeller 16p to generate the hydraulic pressure to be applied to and controlled by the hydraulic control circuit 34.

Figures 2, 3:
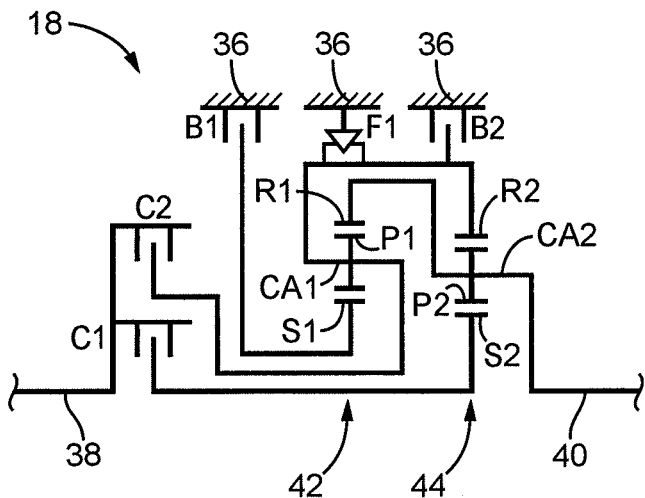
FIG. 2 schematically depicts an example of an automatic transmission provided in the hybrid vehicle of FIG. 1.
FIG. 3 is a table indicating combinations of operating states of hydraulically operated frictional coupling devices used to shift the automatic transmission of FIG. 2.

FIG. 2 schematically depicts an example of an arrangement of the automatic transmission 18 of the drive system 10. Since this automatic transmission 18 is symmetrical in construction with respect to its axis, a lower half of the automatic transmission 18 is not shown in FIG. 2. As shown in FIG. 2, the automatic transmission 18 is a step-variable automatic transmission mechanism which is principally constituted by planetary gear sets 42 and 44 of a single-pinion type, for instance, disposed in a power transmitting path between an input shaft 38 connected to the turbine impeller 16t of the torque converter 16, and an output shaft 40 connected to the differential gear device 20. The automatic transmission 18 is configured to selectively establish one of a plurality of predetermined shift positions (speed ratios). The planetary gear sets 42, 44 are respectively provided with: sun gears S1 and S2; planetary gears P1 and P2; carriers CA1 and CA2 which support the respective planetary gears P1 and P2 such that the planetary gears P1 and P2 are rotatable about their axes and about an axis of the planetary gear sets 42, 44; and ring gears R1 and R2 meshing with the respective sun gears S1 and S2 through the respective planetary gears P1 and P2.

The automatic transmission 18 is provided with a plurality of hydraulically operated frictional coupling devices which are engaged or released in different combinations to selectively establish the plurality of predetermined shift positions. That is, the automatic transmission 18 is configured such that the sun gear S1 is selectively fixed to the casing 36 through a first brake B1, and such that the carrier CA1 and ring gear R2, which are integrally fixed to each other, are optionally fixed to the casing 36 through a second brake B2, and are permitted, by a one-way clutch F1, to rotate relative to the casing 36 in one of two opposing directions but inhibited by the one-way clutch F1 from rotating relative to the casing 36 in the other direction. The automatic transmission 18 is further configured such that the sun gear S2 is selectively connected to the input shaft 38 through a first clutch C1, and such that the carrier CA1 and ring gear R2 integrally fixed to each other are selectively connected to the input shaft 38 through a second clutch C2, while the ring gear R1 and carrier CA2, which are integrally fixed to each other, are fixed to the output shaft 40.

Each of the first clutch C1, second clutch C2, first brake B1 and second brake B2 (hereinafter collectively referred to as "clutches C and brakes B", unless otherwise specified) is a hydraulically operated frictional coupling device that is a coupling element commonly used in a conventional vehicular automatic transmission, and is constituted by a wet multiple-disk type coupling element, for example, having a plurality of friction plates superposed on each other and forced against each other by a hydraulic actuator, or by a band brake having one band or two bands which is/are wound on an outer circumferential surface of a rotatable drum and tightened by a hydraulic actuator fixed to its or their one end. Each coupling element is interposed between two members, and arranged to selectively connect those two members to each other.

FIG. 3 is a table indicating combinations of the operating states of the hydraulically operated frictional coupling devices used to shift the automatic transmission 18. As shown in FIG. 3, the automatic transmission 18 is placed in a first speed gear position "1st" having a highest speed ratio γ1 of about 3.20, for example, when the first clutch C1 and second brake B2 are placed in the engaged states. When the automatic transmission 18 is shifted down from a second speed gear position (or a third speed gear position) to the first speed gear position, the rotary motion of the carrier CA1 and ring gear γ2 relative to the casing 36 are inhibited by the one-way clutch F1, so that the second brake B2 need not be engaged. When the first clutch C1 and first brake B1 are placed in the engaged state, the automatic transmission 18 is placed in a second speed gear position "2nd" having a speed ratio γ2 of about 1.72, for example, which is lower than the speed ratio of the first speed gear position. When the first clutch C1 and second clutch C2 are placed in the engaged state, the automatic transmission 18 is placed in a third speed gear position "3rd" having a speed ratio γ3 of about 1.00, for example, which is lower than the speed ratio of the second speed gear position. When the second clutch C2 and first brake B1 are placed in the engaged state, the automatic transmission 18 is placed in a fourth speed gear position "4th" having a speed ratio γ4 of about 0.67, for example, which is lower than the speed ratio of the third speed gear position. When the first clutch C1 and second brake B2 are placed in the engaged state, the automatic transmission 18 is placed in a rear drive gear position (reverse shift position) "R" having a speed ratio γR of about 3.20, for example. When the first clutch C1, second clutch C2, first brake B1 and second brake B2 are placed in the released state, the automatic transmission 18 is placed in a neutral position "N".

Referring again to FIG. 1, the electric motor MG is a motor/generator which is provided with a rotor 30 supported by the casing 36 rotatably about its axis, and a stator 32 integrally fixed to the casing 36 radially outwardly of the rotor 30. The electric motor MG functions as an electric motor which generates a drive force, and an electric generator which generates a reaction force. The electric motor MG is connected through an inverter 56 to an electric-energy storage device 58 such as a battery or capacitor, and an operation of the electric motor MG is controlled by the electronic control device 50 described below, which regulates an amount of drive current to be applied through the inverter 56 to a coil of the electric motor MG. In other words, the output torque of the electric motor MG is increased and reduced through the inverter 56.

In a power transmitting path between the engine 12 and electric motor MG, there is disposed a clutch K0 to control transmission of power through that power transmitting path depending upon its operating state. Namely, an output member of the engine 12 in the form of a crankshaft 26 is selectively connected to the rotor 30 of the electric motor MG through the clutch K0. The rotor 30 of the electric motor MG is fixed to an input member of the torque converter 16 in the form of a front cover. For example, the clutch K0 may be a hydraulically operated frictional coupling device of a multiple-disk type which is operated by a hydraulic actuator, that is, selectively placed in one of an engaged state (fully engaged state), a slipping state and a released state (fully released state) according to the hydraulic pressure received from the hydraulic control circuit 34. That is, a torque capacity of the clutch K0 is controlled according to the hydraulic pressure received from the hydraulic control circuit 34. A power transmitting path between the crankshaft 26 and the front cover of the torque converter 16 is placed in a power transmitting state (connected state) when the clutch K0 is placed in the engaged state, and in a power cut-off state when the clutch K0 is placed in the released state. When the clutch K0 is placed in the slipping state, the state of power transmission through the power transmitting path between the crankshaft 26 and the front cover of the torque converter 16 varies with the torque capacity of the clutch K0 (i.e., changes with the torque transmitted through the clutch K0).

The drive system 10 is provided with the control system depicted in FIG. 1. In the embodiments described herein, the electronic control device 50 may include a processor and a memory storing a computer readable and executable instruction set which, when executed by the processor, controls the various functions of the hybrid vehicle, including, without limitation, the drive system 10. For example, the electronic control device 50 may include a so-called microcomputer incorporating a CPU, a RAM, a ROM and an input-output interface. The CPU performs signal processing operations according to programs stored in the ROM, while utilizing a temporary data storage function of the RAM, to implement various controls such as a drive control of the engine 12, a drive control of the electric motor MG, a shifting control of the automatic transmission 18, an engaging force control of the clutch K0, and an engaging control of the lock-up clutch LU. This electronic control device 50 is constituted by a plurality of control units, as needed, such as a unit for controlling the engine 12, a unit for controlling the electric motor MG, and a unit for controlling the automatic transmission 18. These control units may be configured to implement respective control operations, while effecting mutual communications. In this embodiment, the electronic control device 50 corresponds to a control apparatus for the hybrid vehicle (drive system 10).

As indicated in FIG. 1, the electronic control device 50 receives various input signals generated by respective sensors provided in the drive system 10, such as: an output signal of an accelerator pedal operation amount sensor 62 indicative of an operation amount Acc (%) of an accelerator pedal (not shown); an output signal of an engine speed sensor 64 indicative of an operating speed $N_E$ (rpm) of the engine 12 (engine speed NE); an output signal of a turbine speed sensor 66 indicative of a rotating speed $N_T$ (rpm) of the turbine impeller 16t of the torque converter 16 (turbine speed $N_T$); an output signal of an electric motor speed sensor 68 indicative of an operating speed $N_{MG}$ (rpm) of the electric motor MG (electric motor speed $N_{MG}$); and an output signal of a vehicle speed sensor 70 indicative of a vehicle running speed V (km/h).

The electronic control device 50 generates various signals to be applied to respective devices provided in the drive system 10, such as: signals to be applied to the output control device 14 for the engine 12, to control the operation of the engine 12; a signal to be applied to the inverter 56, to control the operation of the electric motor MG; signals to be applied to a plurality of electromagnetic control valves provided in the hydraulic control circuit 34, to control the shifting actions of the automatic transmission 18; a signal to be applied to a linear solenoid valve provided in the hydraulic control circuit 34 to control the engaging action of the clutch K0; a signal to be applied to a linear solenoid valve provided in the hydraulic control circuit 34 to control the engaging action of the lock-up clutch LU; and a signal to be applied to a linear solenoid valve provided in the hydraulic control circuit 34 to control a line pressure.

Figure 4:
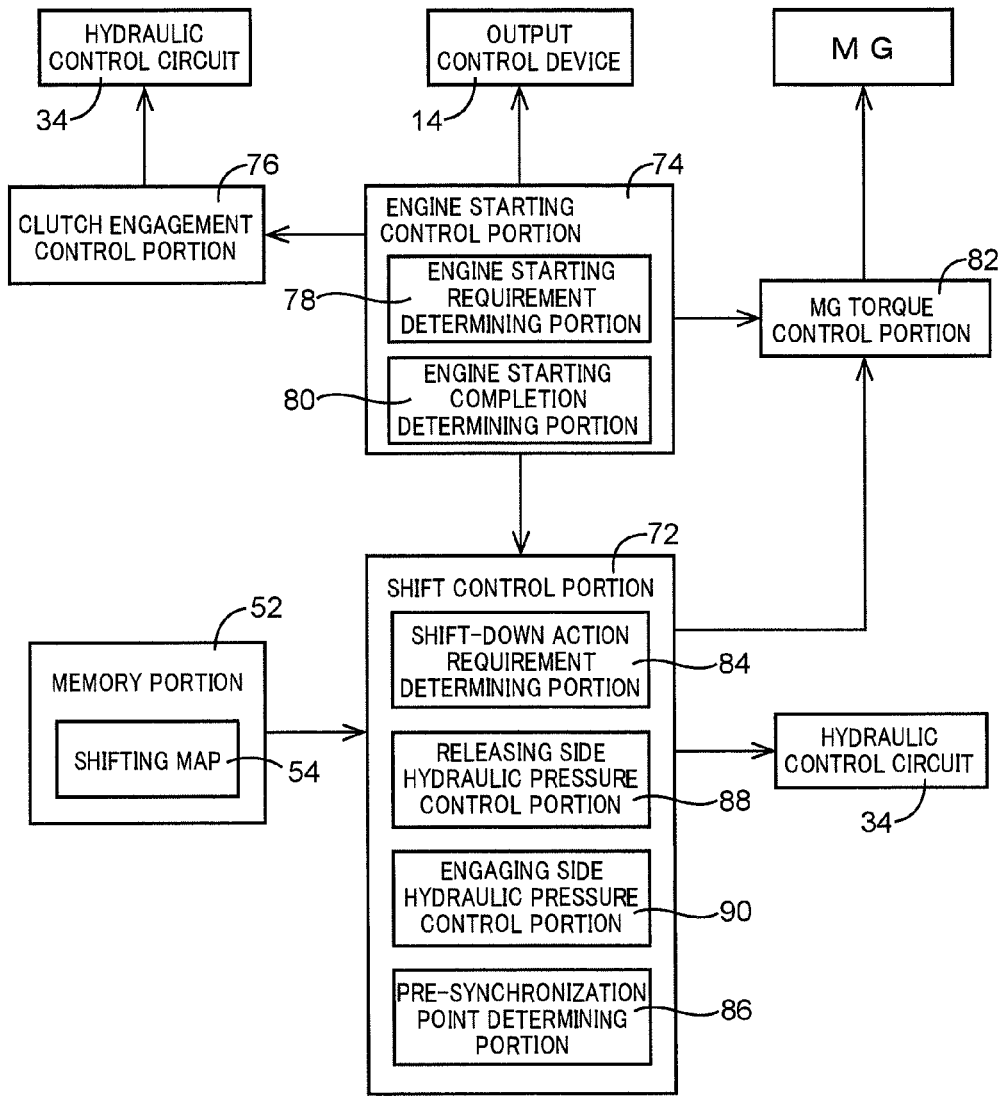
FIG. 4 is a functional block diagram of major control functions of an electronic control device of the hybrid vehicle of FIG. 1.

FIG. 4 is a functional block diagram of the major control functions of the electronic control device 50. While these control functions are performed by respective control portions functionally incorporated in the embodiment of the electronic control device 50 shown in FIG. 4, it should be understood that the control portions may be discrete control units which effect mutual communications to perform the various control functions which will be described in further detail herein. A shift control portion 72 shown in FIG. 4 is configured to control the shifting actions of the automatic transmission 18. Namely, the shift control portion 72 is configured to determine the shift position (gear position) of the automatic transmission 18 to be established, on the basis of the running condition of the vehicle as represented by the accelerator pedal operation amount Acc detected by the accelerator pedal operation amount sensor 62 and the vehicle running speed V detected by the vehicle speed sensor 70, and according to a predetermined relationship such as a shifting map 54 stored in a memory portion 52, for example. To establish the determined shift position, the shift control portion 72 commands the hydraulic control circuit 34 to engage or release the clutches C and brakes B in the automatic transmission 18. That is, the shift control portion 72 controls the output pressures of the electromagnetic control valves provided in the hydraulic control circuit 34 to control the respective clutches C and brakes B, for controlling the hydraulic pressures to be applied to the respective clutches C and brakes B, to thereby shift the automatic transmission 18 to the determined shift position.

An engine starting control portion 74 is configured to implement an engine starting control for starting the engine 12. For example, the engine starting control portion 74 starts the engine 12 by engaging the clutch K0, when the vehicle drive mode is changed from the EV drive mode exclusively using the electric motor MG as the drive power source, to the engine drive mode or hybrid drive mode using the engine 12 as the drive power source. Namely, the engine starting control portion 74 commands a clutch engagement control portion 76 (described below), to place the clutch K0 in its slipping state, thereby transmitting a torque (dragging torque) to the engine 12 through the clutch K0, to cause a rotary motion of the engine 12, so that the engine operating speed $N_E$ is increased while the engine ignition and fuel supply are initiated under the control of the output control device 14, whereby the engine 12 is started.

Figure 5:
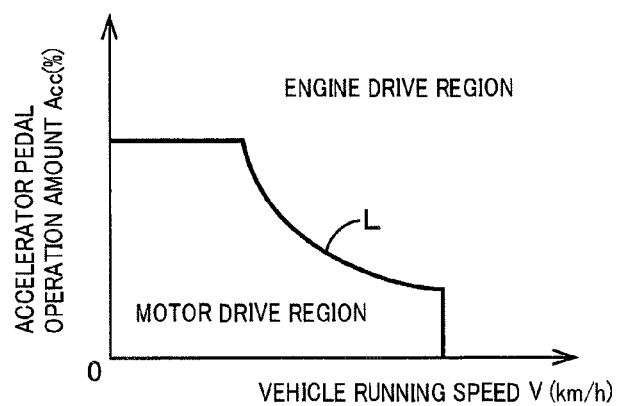
FIG. 5 graphically depicts an example of a relationship used for determining switching between a vehicle drive mode exclusively using the electric motor as a drive power source and a vehicle drive mode using the engine as a drive power source in the hybrid vehicle of FIG. 1.

An engine starting requirement determining portion 78 is configured to determine whether the vehicle drive mode is required to be changed from the EV drive mode using the electric motor MG as the drive power source to the engine drive mode or hybrid drive mode using the engine 12 as a drive power source, that is, determining whether the engine should be started. FIG. 5 indicates an example of a switching line L used for switching between the EV drive mode (motor drive region) exclusively using the electric motor MG as the drive power source and the engine drive mode or hybrid drive mode (engine drive region) using the engine 12 as a drive power source. The switching line L is defined as a relationship between the vehicle running speed V and the accelerator pedal operation amount Acc in a two-dimensional coordinate system. According to this relationship, the engine starting requirement determining portion 78 determines that a start of the engine is required if the vehicle running state represented by the actual vehicle running speed V and accelerator pedal operation amount Acc is changed from the motor drive region to the engine drive region.

An engine starting completion determining portion 80 is configured to determine whether the start of the engine is completed, that is, whether the operation of the engine 12 is initiated and self-sustaining. For instance, the engine starting completion determining portion 80 determines the completion of the engine starting, when the clutch K0 has been brought into a non-slipping state, with the engine speed NE being increased into synchronization with the electric motor speed $N_{MG}$.

The clutch engagement control portion 76 is configured to implement an engagement control of the clutch K0 through a linear solenoid valve provided in the hydraulic control circuit 34, when the engine starting requirement determining portion 78 has determined that a start of the engine is required. Namely, upon determination that a start of the engine starting is required, the clutch engagement control portion 76 holds the clutch K0 in a slipping state, to increase the engine speed $N_E$ with a dragging torque of the clutch K0. When the clutch K0 has been brought into the non-slipping state, that is, when the engine speed $N_E$ has been increased into synchronization with the electric motor speed $N_{MG}$, the clutch engagement control portion 76 holds the clutch K0 in its fully engaged state.

An MG torque control portion 82 is configured to control the torque of the electric motor MG so as to generate a vehicle drive force according to the accelerator pedal operation amount Acc in the motor driving, and to temporarily control the torque of the electric motor MG depending upon the running state of the vehicle. When the engine starting requirement determining portion 78 determines that a start of the engine is required, the MG torque control portion 82 controls the torque of the electric motor MG so as to prevent a reduction of the drive torque transmitted to the drive wheels 24 below a drive torque value prior to a moment of initiation of the start of the engine, during a time period from a moment of initiation of a slipping action of the clutch K0 for the start of the engine to a moment of determination by the engine starting completion determining portion 80 that the start of the engine is completed. Namely, the MG torque control portion 82 temporarily increases the torque of the electric motor MG by an amount corresponding to the dragging torque of the clutch K0 which is generated in its slipping state under the control of the clutch engagement control portion 76 and which is transmitted to the crankshaft 26 of the engine 12 for increasing its rotating speed for starting the engine, that is, by an amount corresponding to an engine starting torque (indicated in FIG. 7).

A shift-down action requirement determining portion 84 is configured to determine whether a shift-down action of the automatic transmission 18 to a lower speed gear position is required. For instance, the shift-down action requirement determining portion 84 determines that a shift-down action is required if the vehicle running state represented by the vehicle running speed V and accelerator pedal operation amount Acc, as variables, has changed to move across a shift-down line represented by the stored shifting map 54.

A pre-synchronization point determining portion 86 is configured to determine, for example, whether a pre-synchronization point of time immediately before the rotating speed of the input shaft 38 (input speed) of the automatic transmission 18 has been increased to the speed value to be established upon completion of the shift-down action has been reached while releasing and engaging actions of the relevant clutch C and brake B of the automatic transmission 18 are controlled via the hydraulic control circuit 34 by the shift control portion 72 so as to establish the speed gear position (shift position) selected according to the shifting map 54. For example, the pre-synchronization point determining portion 86 makes the determination as to whether this pre-synchronization point of time has been reached, depending upon whether a difference of the rotating speed of the input shaft 38 of the automatic transmission 18 with respect to the speed value to be established upon completion of the shift-down action falls within a predetermined range.

A releasing side hydraulic pressure control portion 88 is configured to control an output pressure of a solenoid-operated control valve (electromagnetic control valve) provided in the hydraulic control circuit 34 to control the clutch to be released to establish the speed gear position selected according to the shifting map 54 during a clutch-to-clutch shift-down action of the automatic transmission 18 under the control of the shift control portion 72. Further, upon the determination by the engine starting requirement determining portion 78 that a start of the engine is required concurrently with the determination by the shift-down action requirement determining portion 84 that the shift-down action is required, the releasing side hydraulic pressure control portion 88 quickly reduces the hydraulic pressure of the releasing side clutch (for example, the second clutch C2 in the case of the shift-down action from the third speed gear position "$3^{rd}$" to the second speed gear position "$2^{nd}$"), and then holds the hydraulic pressure at a lowest stand-by value which prevents the slipping action of the releasing side clutch. The hydraulic pressure is temporarily held at this lowest stand-by value for a predetermined length of time until the engine starting completion determining portion 80 determines that the start of the engine is completed. When the engine starting completion determining portion 80 determines that the start of the engine is completed, the releasing side hydraulic pressure control portion 88 slowly reduces the hydraulic pressure of the releasing side clutch from the lowest stand-by value at which the hydraulic pressure is held before completion of the start of the engine, that is, in the slipping state of the clutch K0. The lowest stand-by value preventing the slipping action of the releasing side clutch is, for example, a pressure value which is higher, by an amount α (predetermined by experimentation), than a value at which the automatic transmission enters its inertia phase.

An engaging side hydraulic pressure control portion 90 is configured to control an output pressure of a solenoid-operated control valve provided in the hydraulic control circuit 34 to control the clutch to be engaged to establish the speed gear position selected according to the shifting map 54 during the clutch-to-clutch shift-down action of the automatic transmission 18 under the control of the shift control portion 72. Further, upon the determination by the engine starting requirement determining portion 78 that a start of the engine is required, concurrently with the determination by the shift-down action requirement determining portion 84 that the shift-down action is required, the engaging side hydraulic pressure control portion 90 quickly increases the hydraulic pressure of the engaging side clutch (for example, the first brake B1 in the case of the shift-down action from the third speed gear position "$3^{rd}$" to the second speed gear position "$2^{nd}$") for fast filling of the engaging side clutch from the determination that the shift-down action is required, and then holds the hydraulic pressure at a lower stand-by value until the pre-synchronization point determining portion 86 determines that the pre-synchronization point of time immediately before the rotating speed of the input shaft 38 of the automatic transmission 18 has been increased to the speed value to be established upon completion of the shift-down action has been reached. When the pre-synchronization point determining portion 86 determines that the pre-synchronization point of time immediately before the rotating speed of the input shaft 38 of the automatic transmission 18 has been increased to the speed value to be established upon completion of the shift-down action has been reached, the engaging side hydraulic pressure control portion 90 increases the hydraulic pressure of the engaging side clutch to place this engaging side clutch in its fully engaged state.

The MG torque control portion 82 is also configured to control the torque of the electric motor MG so as to reduce an engaging shock of the engaging side clutch upon its full engagement under the control of the engaging side hydraulic pressure control portion 90. For example, the MG torque control portion 82 temporarily reduces the torque of the electric motor MG in comparison with that prior to the shifting action to reduce the shifting shock upon determination by the pre-synchronization point determining portion 86 that the pre-synchronization point of time immediately before the rotating speed of the input shaft 38 of the automatic transmission 18 has been increased to the speed value to be established upon completion of the shift-down action has been reached.

Figure 6:
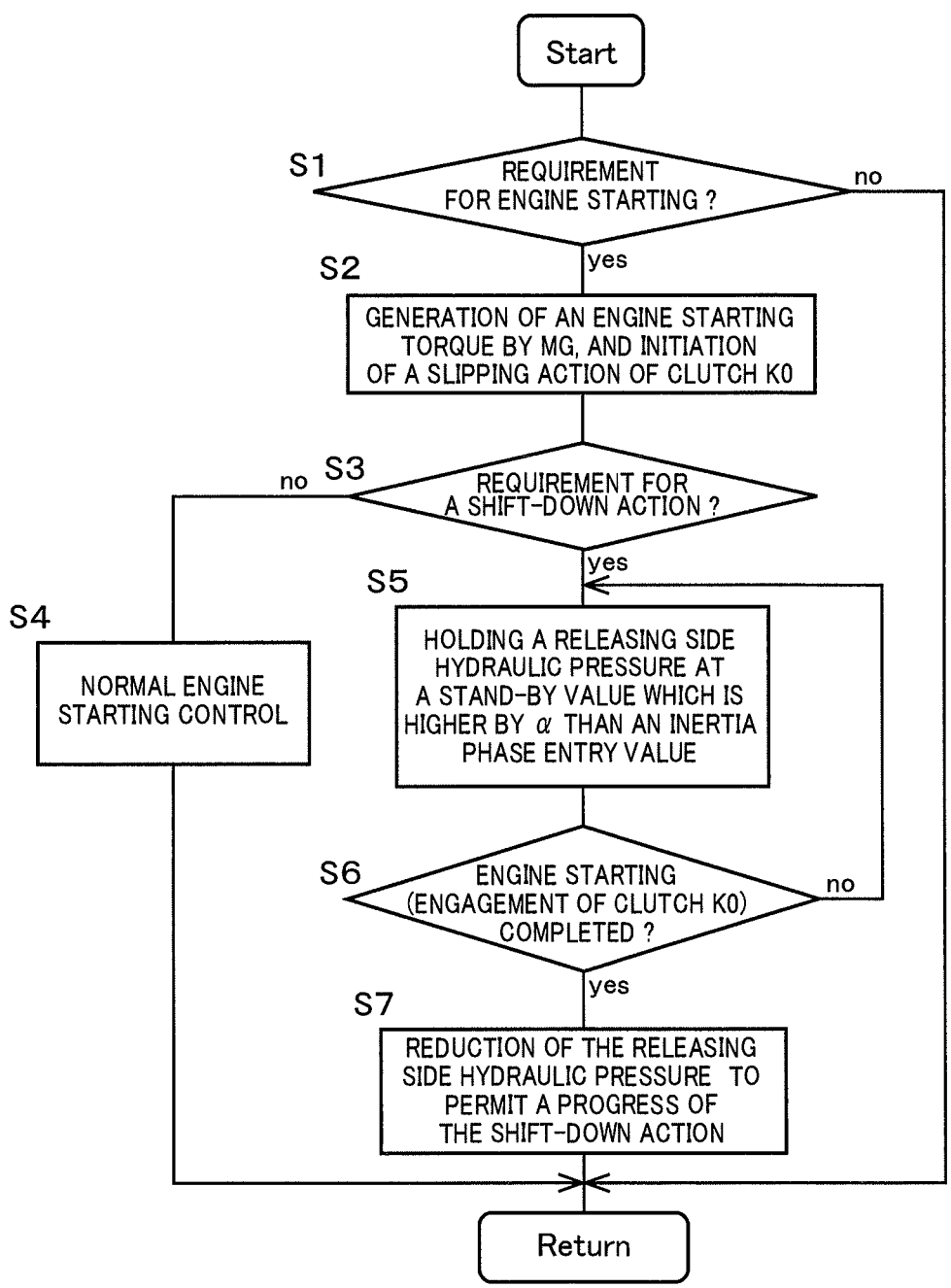
FIG. 6 is a flow chart depicting an example of controls implemented by the electronic control device of FIG. 4 to start the engine and to perform a shift-down action of the transmission when the engine is required to be started while the automatic transmission is required to perform a shift-down action.
Figure 7:
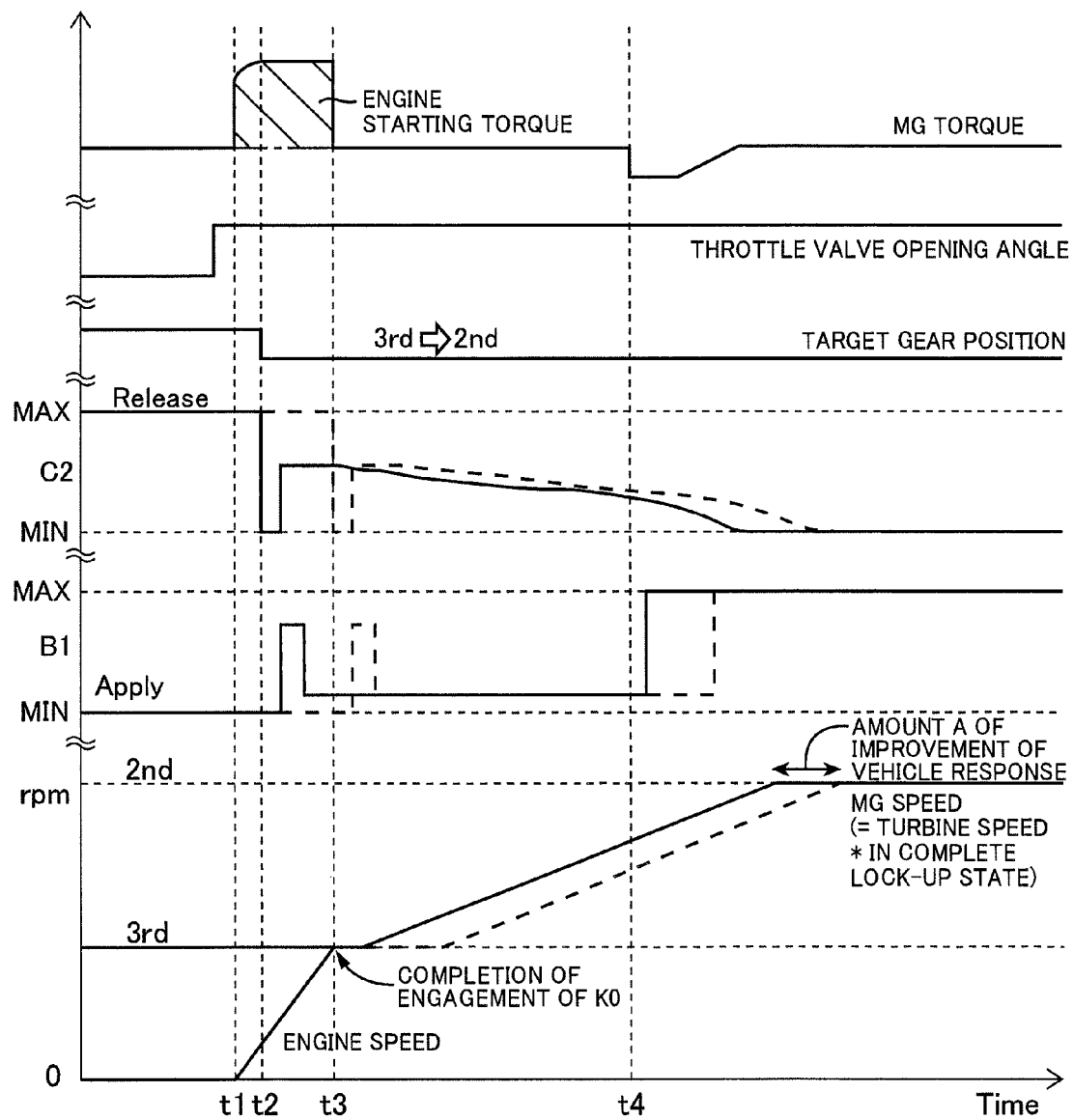
FIG. 7 graphically depicts a time chart showing the control operation of the flow chart of FIG. 6.

FIG. 6 is a flow chart of an example of controls implemented by the electronic control device 50 to start the engine 12 in the EV drive mode in response to the driver's request for acceleration and to perform the shift-down action of the automatic transmission 18 when the engine 12 is required to be started while the automatic transmission 18 is required to be shifted down (from the third speed gear position "$3^{rd}$" to the second speed gear position "$2^{nd}$"). A control routine illustrated in this flow chart is repeatedly executed with a predetermined cycle time. FIG. 7 is a time chart showing the control operation depicted in the flow chart of FIG. 6.

Initially, step S1 ("step" being hereinafter omitted) corresponding to the engine starting requirement determining portion 78 is implemented to determine whether a start of the engine is required. If a negative determination is obtained in S1, the present control routine is terminated. If an affirmative determination is obtained in S1 (at time t1 indicated in FIG. 7), the control flow goes to S2 corresponding to the clutch engagement control portion 76, MG torque control portion 82 and engine starting control portion 74. In S2, the clutch K0 is placed in a slipping state so that the engine speed NE is increased by the dragging torque of the clutch K0. At the same time, upon starting of the engine, the torque of the electric motor MG is increased by an amount corresponding to the dragging torque of the clutch K0 which is generated in its slipping state and which is transmitted to the crankshaft 26 of the engine 12, which amount corresponds to the engine starting torque.

Then, the control flow goes to S3 (corresponding to the shift-down action requirement determining portion 84) to determine whether a shift-down action is required. If a negative determination is obtained in S3, the control flow goes to S4 (corresponding to the clutch engagement control portion 76, MG torque control portion 82 and engine starting control portion 74) to increase the engine speed $N_E$, and initiate the engine ignition and fuel supply through the output control device 14 and thereby start self-sustaining operation of the engine 12.

If an affirmative determination is obtained in S3 (at time t2 in FIG. 7), the control flow goes to S5 (corresponding to the releasing side hydraulic pressure control portion 88 and the engaging side hydraulic pressure control portion 90) to hold the hydraulic pressure of the releasing side clutch C2 at the lowest stand-by value preventing the slipping action of the clutch K0, and hold the hydraulic pressure of the engaging side clutch B1 at the lower stand-by value. FIG. 7 indicates commanded hydraulic pressure values generated from the electronic control device 50 to control the hydraulic pressures of the releasing side clutch C2 and the engaging side clutch B1.

The control flow then goes to S6 (corresponding to the engine starting completion determining portion 80) to determine whether the start of the engine is completed, namely, whether the clutch K0 has been brought into its fully engaged state with synchronization of the engine speed $N_E$ with the electric motor speed $N_{MG}$. If a negative determination is obtained in S6, the control flow goes back to S5, that is, to hold the hydraulic pressure of the releasing side clutch C2 at the lowest stand-by value. Namely, the hydraulic pressure of the releasing side clutch C2 is held at the lowest stand-by value as long as the negative determination is obtained in S6.

If an affirmative determination is obtained in S6 (at time t3 indicated in FIG. 7), the control flow goes to S7 (corresponding to the releasing side hydraulic pressure control portion 88, engaging side hydraulic pressure control portion 90, pre-synchronization point determining portion 86 and MG torque control portion 82). In S7, the hydraulic pressure of the releasing side clutch C2 is slowly reduced from the lowest stand-by value under the control of the releasing side hydraulic pressure control portion 88, so that the engine speed NE and electric motor speed $N_{MG}$ are increased, that is, the rotating speed of the input shaft 38 of the automatic transmission 18 is increased toward the speed value to be established upon completion of the shift-down action to the second speed gear position "$2^{nd}$". When the rotating speed of the input shaft 38 of the automatic transmission 18 has been increased to the speed value to be established upon completion of the shift-down action to the second speed gear position "$2^{nd}$", the torque of the electric motor MG is temporarily reduced under the control of the MG torque control portion 82, and the hydraulic pressure of the engaging side clutch B1 is increased under the control of the engaging side hydraulic pressure control portion 90 so that the clutch B1 is brought into its fully engaged state.

Broken lines in FIG. 7 show conventional controls for a hybrid vehicle wherein the shift-down action of the automatic transmission 18 is implemented after completion of the start of the engine, where the automatic transmission 18 is required to perform the shift-down action while the engine is being started. In the present embodiment shown by solid lines in FIG. 7, the shift-down action is not implemented during the start of the engine, so that the engine speed is increased in the slipping state of the clutch K0 while the rotating speed of the input shaft 38 of the automatic transmission 18, that is, the MG speed is, for example, lower than where the shift-down action is implemented during the start of the engine. The present embodiment is further arranged such that the hydraulic pressure of the releasing side clutch C2 during the start of the engine is held at the lowest stand-by value permitting prevention of the slipping action of the clutch C2, so that the shift-down action can be performed after completion of the start of the engine at a higher rate than in conventional controls for a hybrid vehicle corresponding to an amount A of improvement of the vehicle response.

As described above, the electronic control device 50 of the drive system 10 according to the present embodiment is configured such that when the engine 12 is required to be started while the automatic transmission 18 is required to perform a shift-down action, the hydraulic pressure of the releasing side clutch C2 of the automatic transmission 18 is held at the predetermined lowest stand-by value preventing the slipping action of the releasing side clutch C2, while the clutch K0 is placed in the slipping state, that is, until the clutch K0 is brought into its fully engaged state, so that the start of the engine is implemented while the input speed of the automatic transmission 18 is comparatively low, whereby the amount of slipping of the clutch K0 is reduced. Accordingly, the amount of generation of heat by the clutch K0 during the engine starting can be reduced. Further, the hydraulic pressure of the releasing side clutch C2 is reduced from the lowest stand-by value when the clutch K0 has been brought into the fully engaged state, so that the shift-down action can be performed at a comparatively high rate after the clutch K0 has been brought into the fully engaged state, so that the response of the hybrid vehicle to the operator's desire for a high degree of acceleration can be improved over the case where the shift-down action is implemented after completion of the start of the engine, for example.

The electronic control device 50 of the drive system 10 according to the present embodiment is further configured such that the shift-down action is performed with a releasing action of the releasing side clutch C2, and the torque of the electric motor MG is temporarily reduced when the input speed of the automatic transmission 18 has been increased to the speed value to be established after completion of the shift-down action. Accordingly, it is possible to effectively reduce the engaging shock of the engaging side clutch B1 which takes place when the input speed of the automatic transmission 18 has been increased to the speed value to be established upon completion of the shift-down action.

Second Embodiment

Another embodiment of the control apparatus for a hybrid vehicle will now be described. In the following description, the same reference signs will be used to identify the same elements in the different embodiments, which elements will not be described redundantly.

Figure 8:
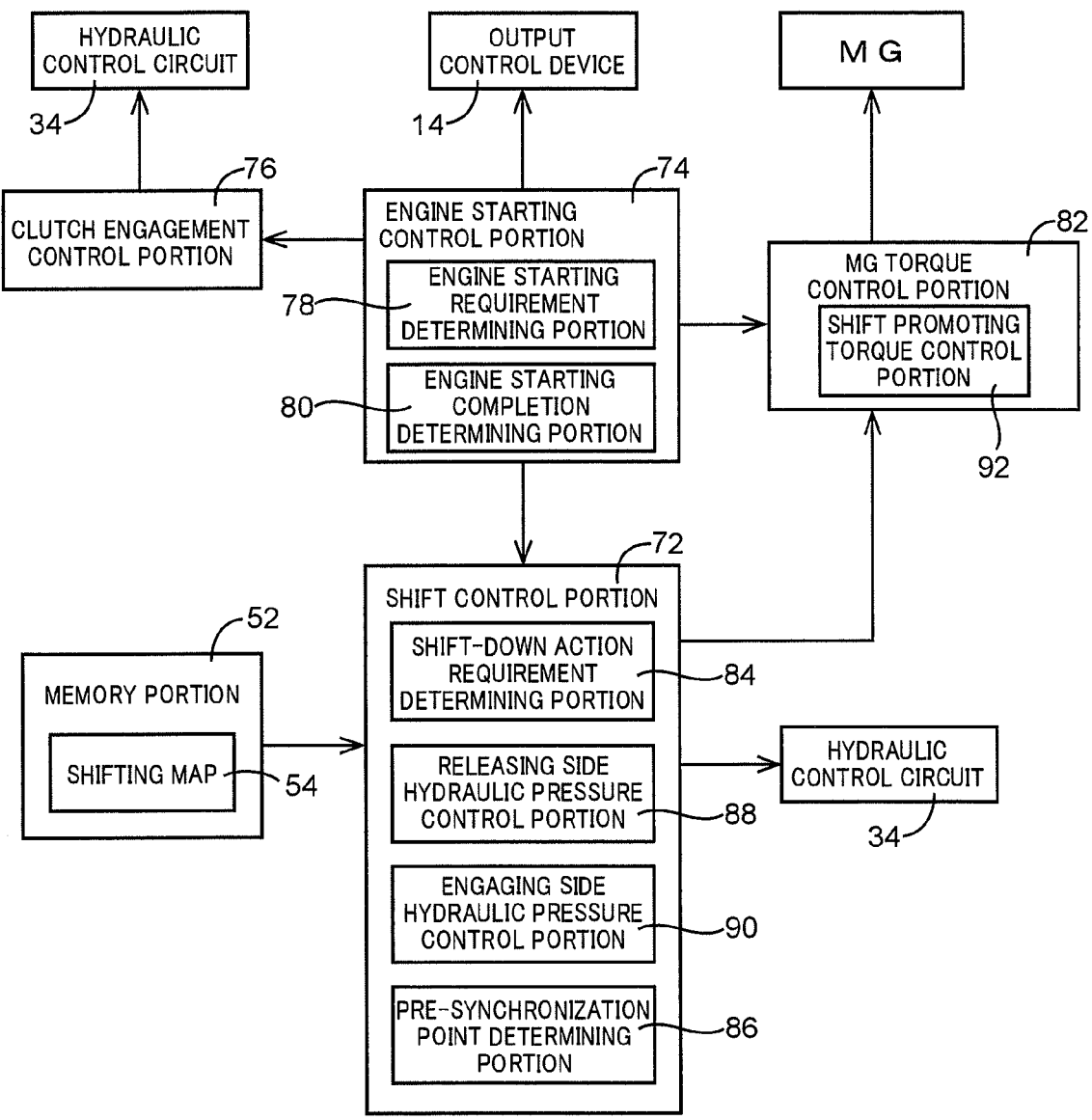
FIG. 8 is a functional block diagram corresponding to FIG. 4 showing the major control functions of an electronic control device of the hybrid vehicle according to another embodiment described herein.

The electronic control device of the drive system 10 according to the present embodiment is different from the electronic control device 50 according to the first embodiment described above in that the MG torque control portion 82 is provided with a shift promoting torque control portion 92, as shown in FIG. 8. Otherwise, the electronic control device 50 is substantially identical with the electronic control device described above.

The shift promoting torque control portion 92 is configured to control the torque of the electric motor MG such that the electric motor MG generates a shift promoting torque for promoting a progress of the shift-down action after generation of the engine starting torque for implementing the start of the engine. Namely, the shift promoting torque control portion 92 controls the torque of the electric motor MG such that the torque of the electric motor MG is temporarily kept at a greater value than a torque value before a moment of determination of the requirement for the shift-down action during a time period of reduction of the hydraulic pressure of the releasing side clutch from the lowest stand-by value while the clutch K0 is placed in the slipping state, for example, during a time period from a moment of the determination by the engine starting completion determining portion 80 that the start of the engine is completed to a moment when the pre-synchronization point determining portion 86 determines that the pre-synchronization point of time immediately before that the rotating speed of the input shaft 38 of the automatic transmission 18 has been increased to the speed value to be established upon completion of the shift-down action has been reached. This shift promoting torque (indicated in FIG. 10) generated during the time period of reduction of the hydraulic pressure of the releasing side clutch from the lowest stand-by value in the slipping state of the clutch K0 is determined by experimentation such that the generated shift promoting torque effectively promotes the progress of the shift-down action.

Figure 9:
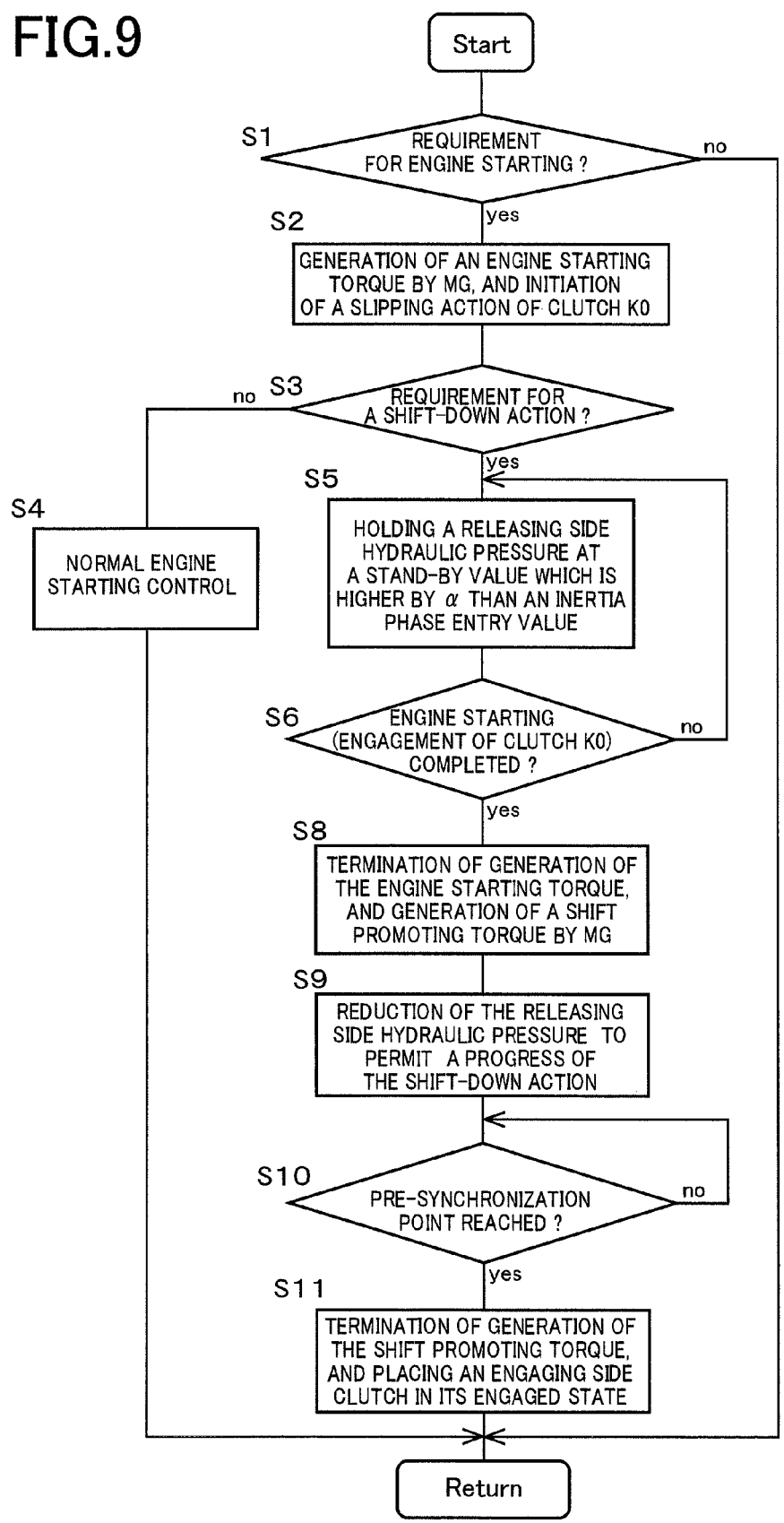
FIG. 9 is a flow chart depicting an example of controls implemented by the electronic control device of FIG. 8 to start the engine and to perform the shift-down action of the transmission when the engine is required to be started while the automatic transmission is required to perform a shift-down action.
Figure 10:
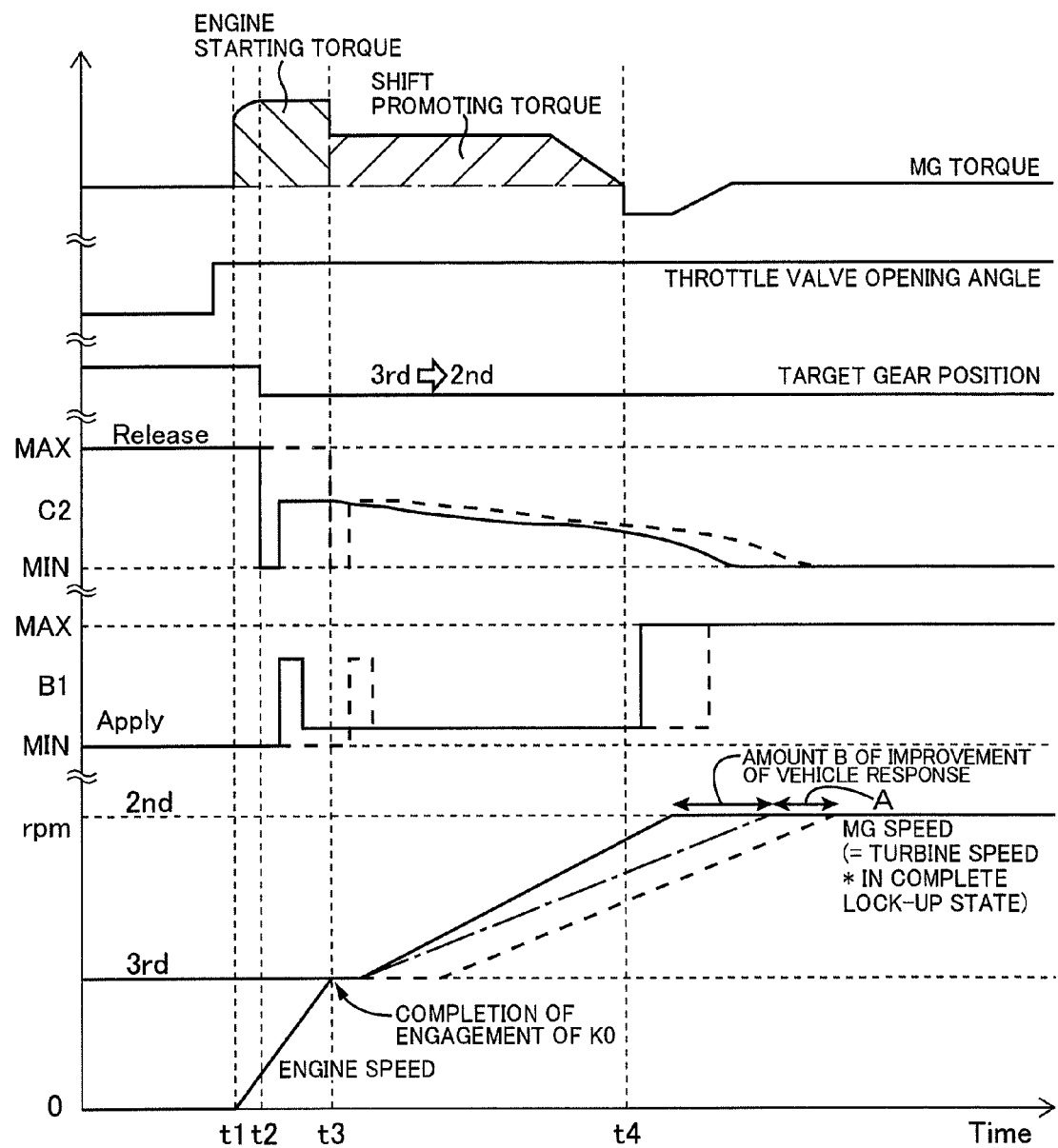
FIG. 10 graphically depicts a time chart showing the control operation of the flow chart of FIG. 9.

FIG. 9 is a flow chart of an example of controls implemented by the electronic control device according to the present embodiment to start the engine in the EV drive mode in response to the driver's request for acceleration and to perform the shift-down action of the automatic transmission 18 when the engine 12 is required to be started while the automatic transmission 18 is required to perform a shift-down action (from the third speed gear position "3$^{rd}$" to the second speed gear position "2$^{nd}$"). A control routine illustrated in this flow chart is repeatedly executed with a predetermined cycle time. FIG. 10 is a time chart showing the control operation depicted in the flow chart of FIG. 9. S1 through S6, according to the present embodiment depicted in FIG. 9, are substantially identical with S1 through S6 according to the preceding embodiment depicted in FIG. 6 and described above and, as such, a description of these steps is omitted to avoid redundancy.

If an affirmative determination is obtained in S6 (at time t3 indicated in FIG. 10), the control flow goes to S8 (corresponding to the MG torque control portion 82 and the shift promoting torque control portion 92) to terminate the generation of the engine starting torque by the electric motor MG, and to command the electric motor MG to generate the shift promoting torque.

Then, the control flow goes to S9 (corresponding to the releasing side hydraulic pressure control portion 88) to reduce the hydraulic pressure of the releasing side clutch C2 from the lowest stand-by value, whereby the engine speed $N_E$ and the electric motor speed $N_{MG}$ are increased, that is, the rotating speed of the input shaft 38 of the automatic transmission 18 is increased toward the speed value to be established upon completion of the shift-down action to the second speed gear position "2$^{nd}$".

The control flow then goes to S10 (corresponding to the pre-synchronization point determining portion 86) to determine whether the pre-synchronization point of time immediately before the rotating speed of the input shaft 38 of the automatic transmission 18 has been increased to the speed value to be established upon completion of the shift-down action to the second speed gear position "2$^{nd}$" has been reached. If a negative determination is obtained in S10, S10 is repeated. If an affirmative determination is obtained in S10 (at time t4 in FIG. 10), the control flow goes to S11 (corresponding to the MG torque control portion 82, shift promoting torque control portion 92 and engaging side hydraulic pressure control portion 90). In S11, the shift promoting torque control portion 92 terminates the generation of the shift promoting torque by the electric motor MG while the MG torque control portion 82 temporarily reduces the torque of the electric motor MG, and the engaging side hydraulic pressure control portion 90 increases the hydraulic pressure of the engaging side clutch B1 to place the engaging side clutch B1 in the fully engaged state.

Broken lines in FIG. 10 show conventional hybrid vehicle controls wherein the shift-down action of the automatic transmission 18 is implemented after completion of the engine starting and where the automatic transmission 18 is required to perform the shift-down action while a start of the engine is required, as in the first embodiment described above. More specifically, a one-dot chain line in FIG. 10 shows the first embodiment while the broken line shows the conventional hybrid vehicle controls. In the present embodiment shown by solid lines, the hydraulic pressure of the releasing side clutch C2 during the start of the engine is held at the lowest stand-by value preventing the slipping action of the clutch C2, as shown in FIG. 10 (as in the first embodiment indicated by the one-dot chain line) so that the shift-down action can be performed after completion of the start of the engine at a higher rate than in conventional hybrid vehicle controls. The present embodiment is further configured such that the shift promoting torque, which is larger than the torque of the electric motor MG before the moment of determination of the requirement for the shift-down action, is temporarily generated during the time period of reduction of the hydraulic pressure of the releasing side clutch C2 from the lowest stand-by value while the clutch K0 is placed in the slipping state, so that the rotating speed of the input shaft 38 of the automatic transmission 18, that is, the engine speed and the MG speed, can be increased to the speed value to be established upon completion of the shift-down action, at a higher rate than in the first embodiment, corresponding to an amount B of improvement of the vehicle response.

As described above, the electronic control device of the drive system 10 according to the present embodiment is configured such that the torque of the electric motor MG is temporarily maintained at a greater value than the torque value before the moment of determination of the requirement for the shift-down action, during the time period of reduction of the hydraulic pressure of the releasing side clutch C2 from the lowest stand-by value while the clutch K0 is placed in the slipping state. Accordingly, the input speed of the automatic transmission 18 can be increased, namely, the engine speed and the MG speed after the synchronization can be increased to the speed value to be established upon completion of the shift-down action, at a comparatively high rate after the clutch K0 has been brought into the fully engaged state, so that the response of the hybrid vehicle to the operator's desire for a high degree of acceleration can be further improved.

While various embodiments of the control apparatuses and systems have been described in detail by reference to the drawings, it is to be understood that the embodiments are not limited to the details of the embodiments illustrated, and may be embodied with various changes, without departing from the spirit and scope of the claimed subject matter.

NOMENCLATURE OF REFERENCE SIGNS

10: Drive system (Hybrid vehicle drive system)
12: Engine
18: Automatic transmission (Transmission)
24: Drive wheels
50: Electronic control device (Control apparatus)
78: Engine starting requirement determining portion
80: Engine starting completion determining portion
82: MG torque control portion
84: Shift-down action requirement determining portion
86: Pre-synchronization point determining portion
88: Releasing side hydraulic pressure control portion
92: Shift promoting torque control portion
C2: Releasing side clutch
K0: Clutch
MG: Electric motor

The invention claimed is:

1. A control apparatus for a hybrid vehicle provided with an engine, an electric motor, a clutch (K0) disposed in a power transmitting path between the engine and the electric motor, and a transmission of a step-variable disposed in a power transmitting path between said electric motor and drive wheels, wherein:

said control apparatus comprises a processor and a memory storing a computer readable and executable instruction set which is executed by the processor to:

increase an operating speed of said engine in a slipping state of said clutch (K0) to complete a start of said engine when an operating state of said clutch (K0) is changed from the slipping state into a fully engaged state;

when said engine is started while said transmission is selected to perform a shift-down action, the control apparatus holds a hydraulic pressure of a releasing side clutch of said transmission at a predetermined lowest stand-by value to prevent a slipping action of said releasing side clutch while said clutch (K0) is in the slipping state when said engine is started while said transmission is selected to perform said shift-down action; and when said engine is started while said transmission is selected to perform the shift-down action, reduce the hydraulic pressure of said releasing side clutch from said predetermined lowest stand-by value at which the hydraulic pressure is held in the slipping state of said clutch (K0), after said clutch (K0) has been placed in the fully engaged state.

2. The control apparatus according to claim 1, wherein a torque of said electric motor is temporarily kept at a greater value than a torque value before a moment of determination of a requirement for the shift-down action as the hydraulic pressure of said releasing side clutch is reduced from said predetermined lowest stand-by value.

3. The control apparatus according to claim 2, wherein said shift-down action is performed with a releasing action of said releasing side clutch, and the torque of said electric motor is temporarily reduced when an input speed of said transmission has been increased to a speed value to be established after completion of the shift-down action.

* * * * *